Figure 1:
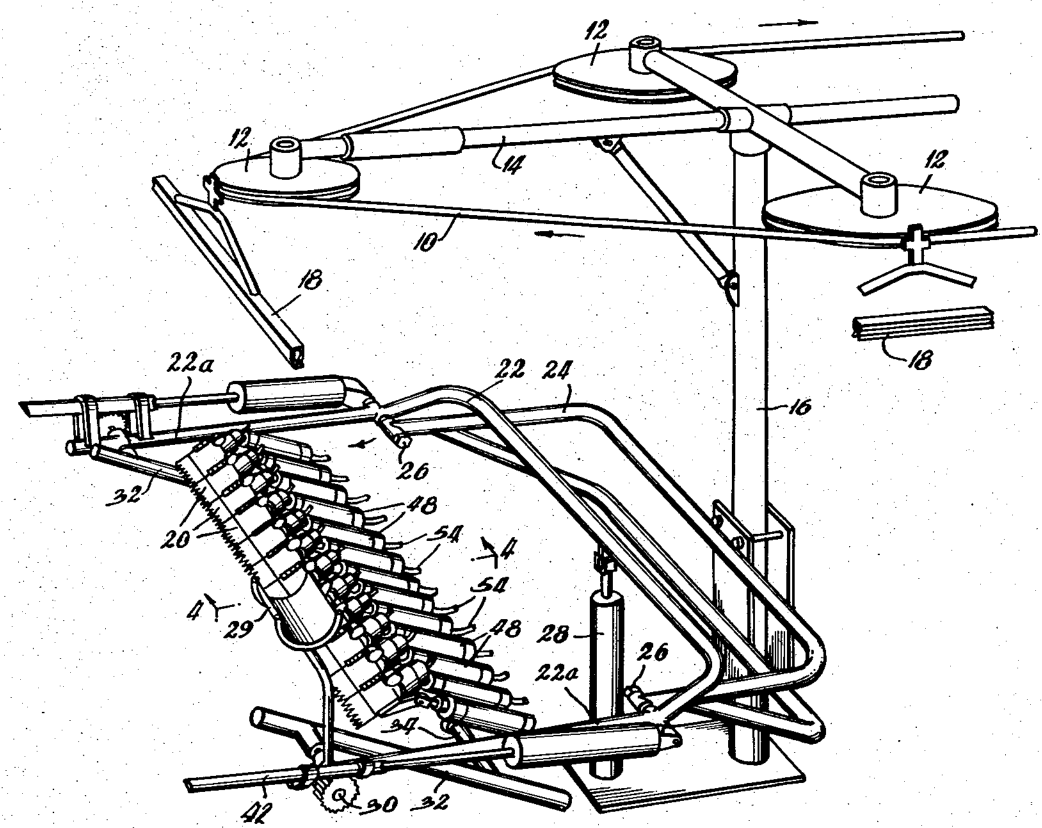

SHEARING APPARATUS FOR ANIMALS, ESPECIALLY SHEEP

Filed Feb. 26, 1962 5 Sheets-Sheet 1

INVENTOR
WILLIAM RICHARD CLIFFORD GEARY
BY Young & Thompson
ATTYS.

SHEARING APPARATUS FOR ANIMALS, ESPECIALLY SHEEP

Filed Feb. 26, 1962 5 Sheets-Sheet 2

INVENTOR

WILLIAM RICHARD CLIFFORD GEARY

BY Young + Thompson

ATTYS.

SHEARING APPARATUS FOR ANIMALS, ESPECIALLY SHEEP
Filed Feb. 26, 1962 5 Sheets-Sheet 3
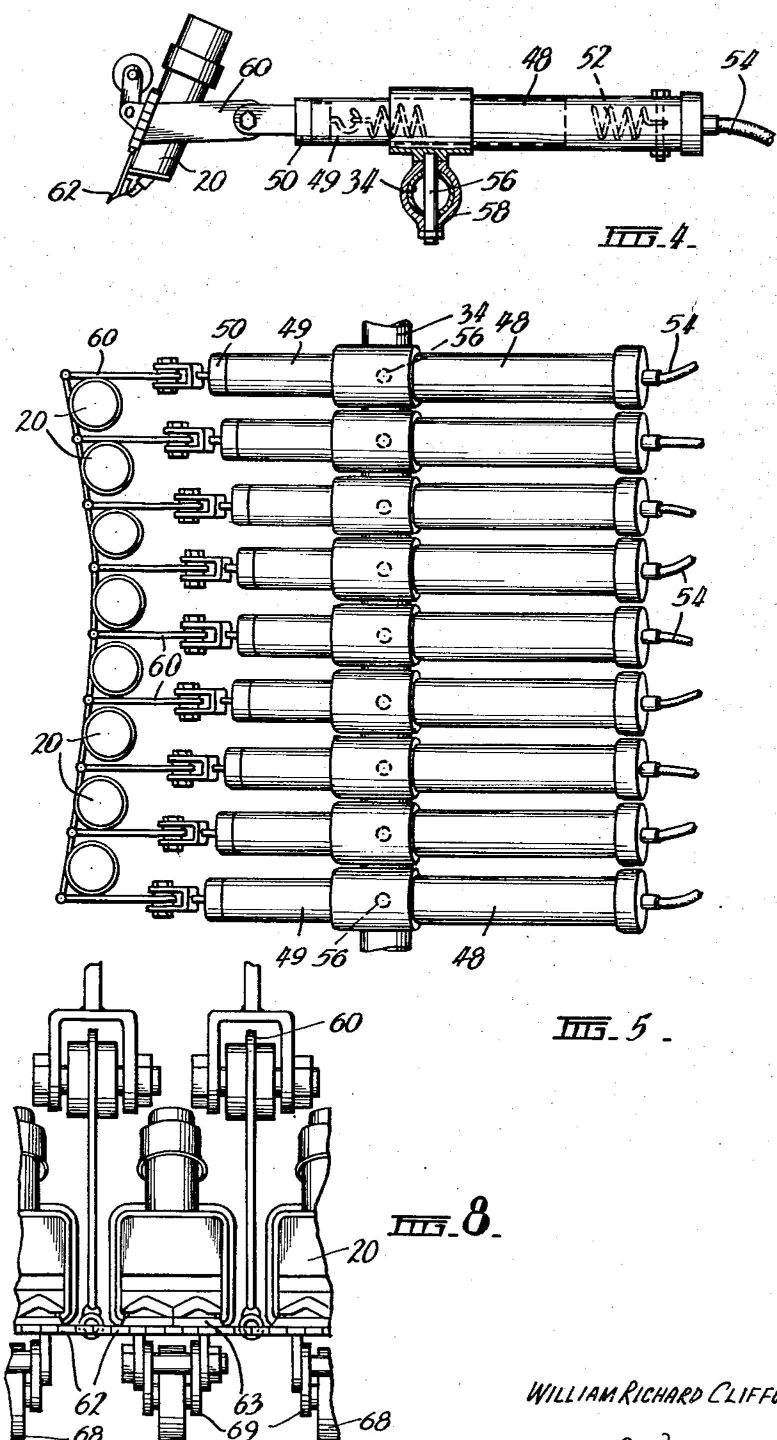
INVENTOR
WILLIAM RICHARD CLIFFORD GEARY
BY Young + Thompson
ATTYS.

SHEARING APPARATUS FOR ANIMALS, ESPECIALLY SHEEP
Filed Feb. 26, 1962
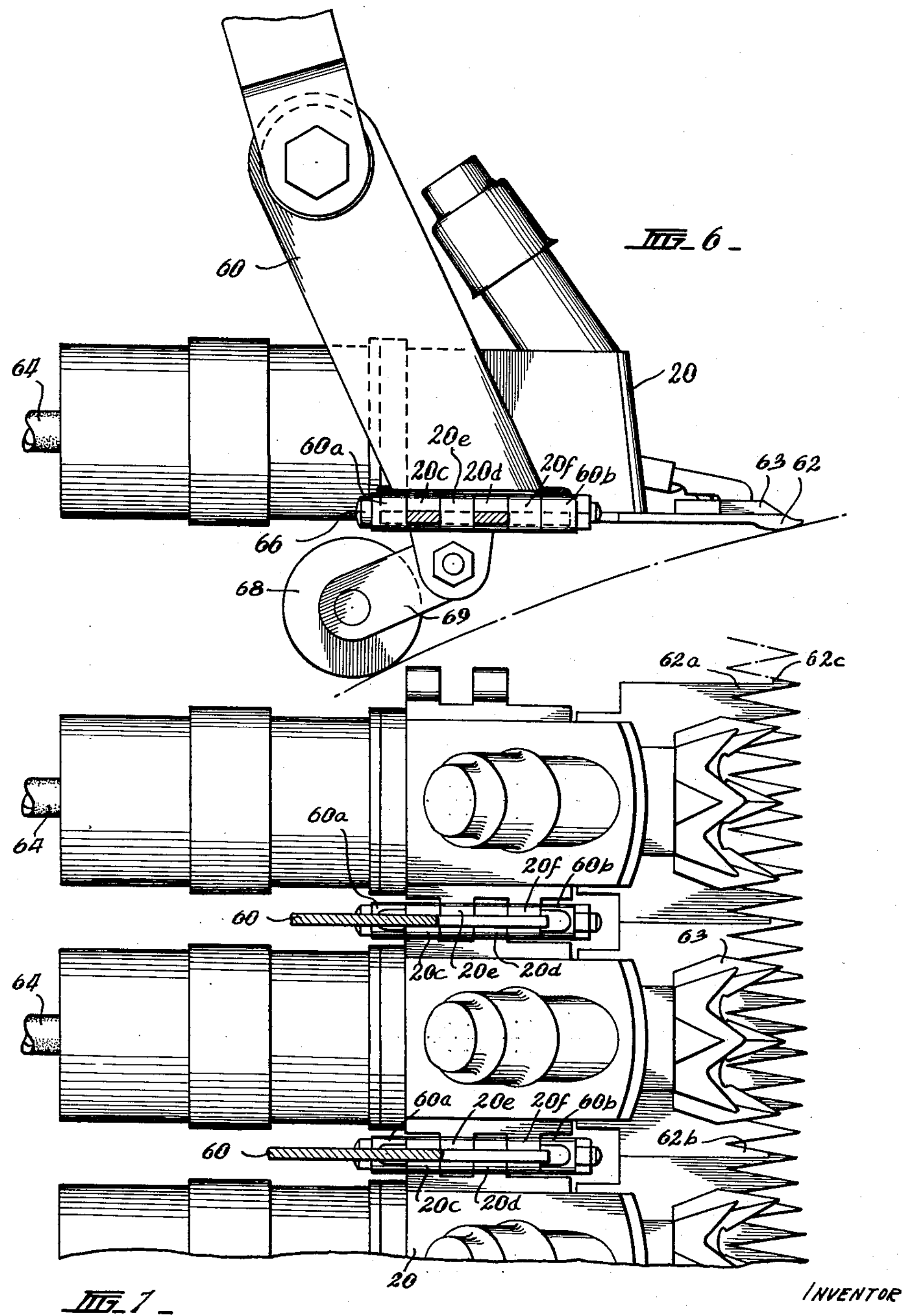
INVENTOR
WILLIAM RICHARD CLIFFORD GEARY
BY Young & Thompson
ATTYS.

SHEARING APPARATUS FOR ANIMALS, ESPECIALLY SHEEP

Filed Feb. 26, 1962 5 Sheets-Sheet 5

INVENTOR

WILLIAM RICHARD CLIFFORD GEARY

BY Young & Thompson

ATTYS.

United States Patent Office 3,145,607

Patented Aug. 25, 1964

3,145,607
SHEARING APPARATUS FOR ANIMALS; ESPECIALLY SHEEP

William Richard Clifford Geary, La Bibby Court, Moorabbin, Victoria, Australia

Filed Feb. 26, 1962, Ser. No. 175,687
Claims priority, application, Australia, Mar. 1, 1961, 2,038/61; Dec. 14, 1961, 12,407/61
13 Claims. (Cl. 83—578)

This invention relates to the shearing of sheep and other animals and its principal object is to provide an improved apparatus whereby this operation may be performed expeditiously and with comparatively low labour costs.

According to the present invention, wool is removed from a sheep or other animal by arranging elongated severing means approximately lengthwise of the animal and by moving said severing means partly around and substantially in contact with the body of the animal which, before and during the shearing operation, is preferably inverted and suspended by its legs.

More particularly, the severing means is preferably sufficiently long to enable the fleece to be removed from the sides and back thereof in one operation and is of resilient or jointed construction whereby it is conformable with the body contours.

According to the preferred form of the invention, the opposite ends of the said severing means are movably supported by pivoted arms which turn in unison about a common horizontal axis passing longitudinally through the body of the animal, means being provided for turning the said arms in unison to move said severing means partly around the body of the animal and for simultaneously pressing the said severing means inwardly to maintain contact with the body.

The said pivoted arms are preferably arranged to be raised and lowered whereby in the lowered position, each successive animal may be moved without obstruction to the shearing position and whereby in the raised position, the common pivotal axis thereof passes longitudinally through the animal as abovementioned.

Preferably the apparatus comprises a plurality of individual shearing units arranged side by side and pivotally connected together, similarly to the links of a chain, about axes disposed at right angles to the length thereof.

More particularly, each shearing unit is preferably a cutter unit comprising a power actuated reciprocable cutter coacting with a fixed comb, as in the usual handheld shears, while the axis of the pivotal connection between each adjacent pair of shearing units is disposed approximately in the cutting plane and so as to pass longitudinally through or close to the teeth at the respective ends of the two combs, these end teeth being preferably shaped to coact as a single tooth.

Preferably a member, e.g. a roller, projects below the base of each cutter unit at a position spaced from the front thereof so as to engage the body of the animal and assist in maintaining the unit at a suitable angle. The said rollers may be free-running or they may be power driven at a suitable speed so as to stretch the skin behind the comb. Alternatively, separate power driven rollers may be arranged behind the cutter units to stretch the skin of the animal.

Means are provided for resiliently pressing each cutter unit inwardly against the body of the animal along a line of action passing between the comb teeth and the rear roller so that both the comb and the roller are maintained in resilient contact with the animal.

The apparatus also preferably includes a shield adapted to insert the head of each inverted animal between its forelegs and to retain it in this position throughout the shearing operation.

Figure 2:
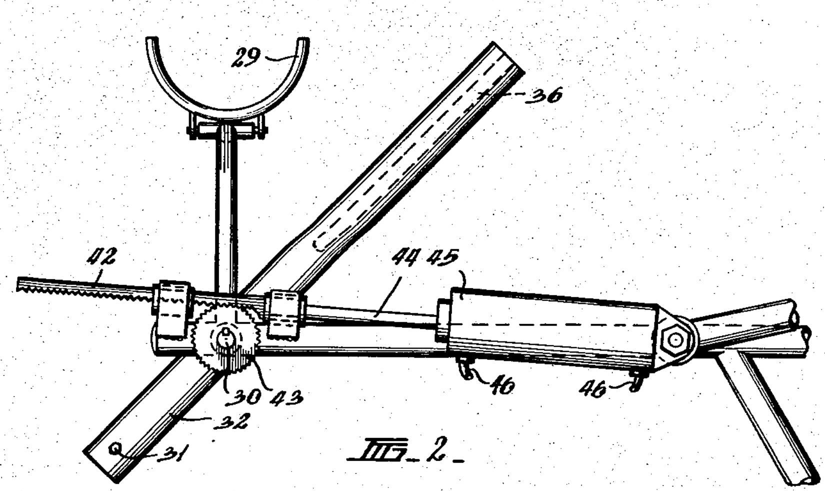
Figure 3:
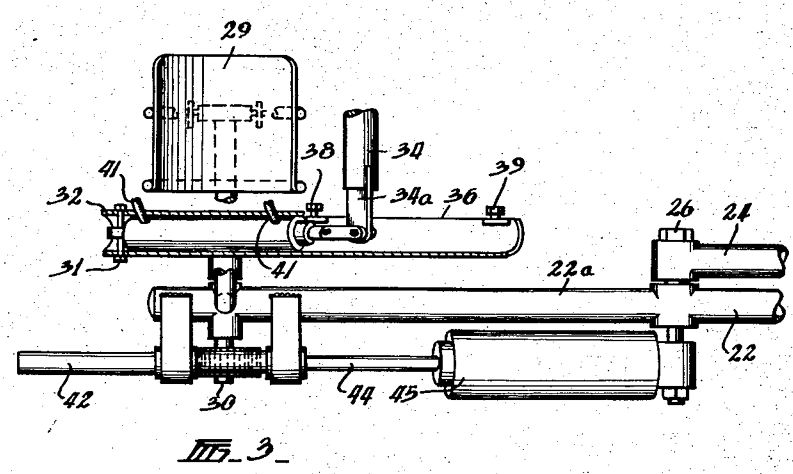
Figure 9:
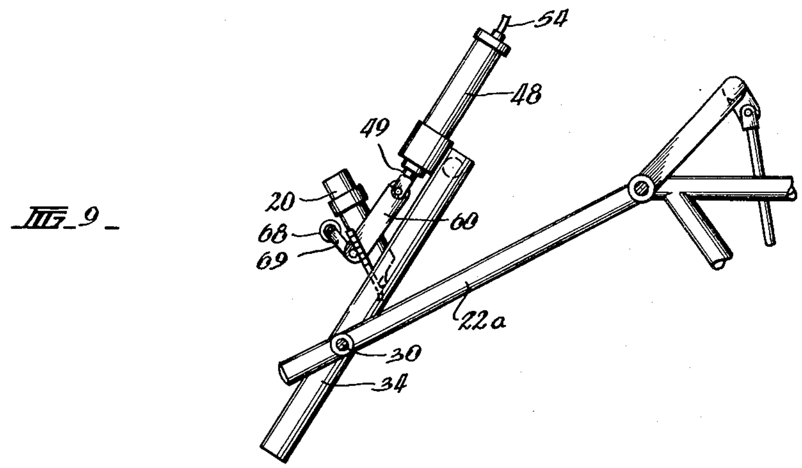
Figure 10:
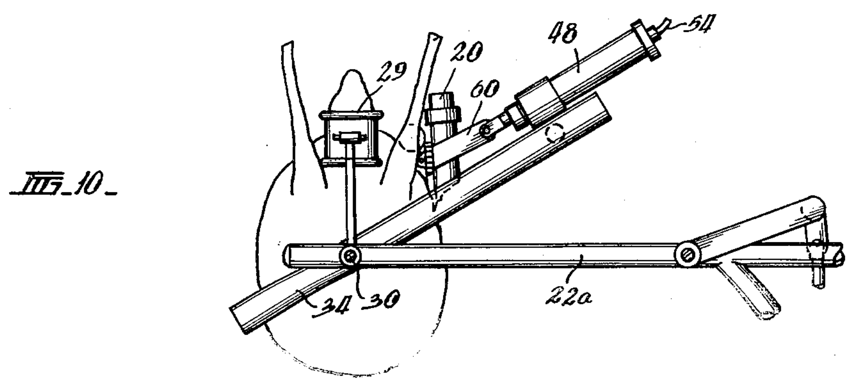
Figure 11:
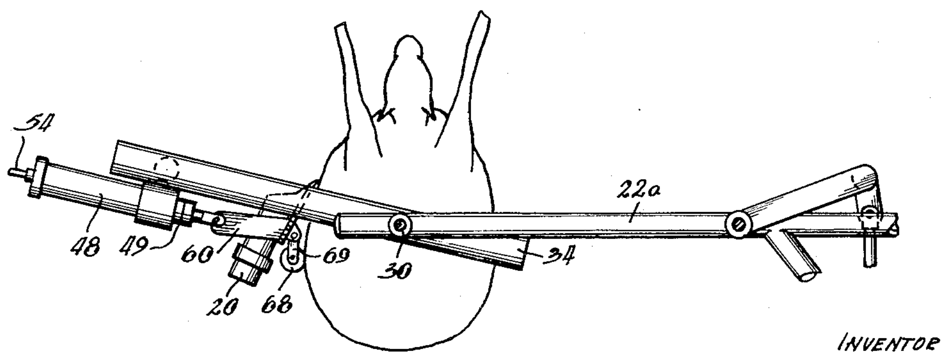

In the following more detailed description of a preferred form of the invention, reference is made to the accompanying drawings, in which:

FIGURE 1 is a perspective view of sheep shearing apparatus and the adjacent portion of a conevyor for delivering the animals in succession thereto, FIGURE 2 is a view in end elevation of the shearing apparatus with the cutter units and other parts omitted, FIGURE 3 in a view in plan of one end of the machine and shows parts thereof in section, FIGURE 4 is a view in sectional end elevation taken in the plane designated 4—4 in FIGURE 1, FIGURE 5 is a plan view showing a series of hingedly connected cutter units arranged with their pivotal axes disposed vertically, FIGURE 6 is a view in side elevation of a cutter unit, FIGURE 7 is a plan view of adjacent cutter units, FIGURE 8 is a view in front elevation of the said cutter units, and FIGURES 9, 10 and 11 are views in end elevation showing different stages in the operation of the apparatus.

The apparatus shown in FIGURE 1 includes an elevated conveyor which may be of any suitable type and which, as illustrated, comprises a cable 10 passing around pulleys 12 mounted on a frame structure 14 supported on a column 16, any suitable means, not shown, being provided for intermittently rotating one of the pulleys whereby spaced carriage bars 18 suspended from the cable are moved in succession to the shearing station shown on the left of the figure. Each carriage bar is provided with two transversely opposed and longitudinally spaced pairs of depending leg clamps which do not form part of this invention and are not shown. Each animal is thus suspended by its legs below a corresponding carriage bar so that it hangs therefrom in the inverted condition. The conveyor thus serves to move the animals in succession and preferably tail first to the shearing station.

A shearing machine arranged at the shearing station comprises a chain-like assembly of cutter units 20 arranged to be raised to, and lowered from, its operative position by a pivoted frame 22, the length of the said assembly being approximately equal to, or greater than, the length of the animals to be shorn so that a substantial proportion of the total fleece may be removed by a single sweep of the cutter units around the animal as hereinafter described.

The frame 22 is of U shape when viewed in plan and its side arms 22*a* are pivotally connected to a fixed bracket structure 24 by coaxial pivot pins 26 arranged so that a carriage located at the shearing station is parallel to the pivotal axis.

The said pivoted frame is raised and lowered as required by means of a vertical air cylinder 28 arranged adjacent to column 16 with its plunger rod projecting upwardly and pivotally connected to the base of the frame 22.

A short spindle 30 is rotatively mounted in the free end of each of the arms 22*a*, these spindles being arranged coaxially and parallel to the pivotal axis of the frame. The free end portion of one of the arms 22*a* also supports a headrest and shield 29 of semi-circular shape which is pivotally connected by a transverse pin to an upstanding support on the said arm.

The projecting inner end of each spindle 30 is rigidly secured to an intermediate portion of a corresponding radial arm 32 of tubular form, the two radial arms 32 and the common pivotal axis thereof being disposed in a common plane. These radial arms slidably support the opposite ends of a longitudinally disposed support bar 34 so that the latter is movable towards and from the pivotal axis of the arms. For this purpose, each end of support bar 34 is extended by a flat sided lug 34*a* which projects into the interior of the respective tubular arm through a longitudinally extending slot 36 in the inner side thereof and adjustable stops 38 and 39 are fitted thereto to limit the inward and outward movements of the support bar.

The inward and outward movements of support bar 34 are imported thereto by double-acting air cylinders 40, one of which is arranged within the inner end portion of each arm 32. Each cylinder 40 has its outer end anchored to the respective arm by a pin 31 while a plunger rod projecting from its inner end is connected by pivoted links to the lugs 34*a* on the respective end of support bar 34. The opposite ends of each cylinder 40 are connected by air pipes 41 to a source of compressed air through a suitable control valve (not shown). Thus when compressed air is supplied to the outer ends of cylinders 40, the support bar 34 is maintained in its normal outermost position determined by the stops 39, while when the said outer ends of the cylinders are connected to exhaust and compressed air is supplied to the inner ends thereof, the support bar is moved bodily inwards to its innermost or operative position which is determined by the adjustable stops 38.

The outer end of the spindle 30 of each radial arm 22*a* is fitted with a pinion 43 in constant mesh with a rack 42 connected to the plunger rod 44 of a corresponding double-acting air cylinder 45 secured to the arm and disposed parallel thereto. Air pipes 46 connect the opposite ends of the two cylinders 45 to a common control valve (not shown) whereby the racks 42 are operated in unison to turn the radial arms 32 in either direction, suitable adjustable stops being provided for engagement by the racks to limit the said angular movements in each direction.

The aforesaid support bar 34 carries a plurality of air cylinders 48 which are spaced apart at equal intervals along the length of the bar 34 and are substantially parallel to each other and to the radial arms 32.

As shown, these cylinders are single-acting and the plungers thereof comprise tubes 49 which project from the inner ends of cylinders 48. The outer end of each plunger is closed by a plug 50 and a tension spring 52 arranged within the respective cylinder 48 is anchored at one end to this plug and at its opposite end to a pin secured within the closed end of the cylinder. Thus the plungers 49 are continuously urged into their retracted positions within the cylinders but may be projected in opposition to the springs 52 by compressed air supplied to the outer ends of the cylinders through flexible air tubes 54. It will be apparent that the cylinders 48 may be replaced by double-acting cylinders if desired.

Each of the said cylinders 48 is pivotally mounted on the support bar 34 about an axis passing diametrically through both the cylinder and the bar, this pivotal axis being thus disposed at right angles to the common plane containing the axes of the several cylinders which can thus swivel sidewise in this plane. For this purpose, each cylinder is provided with a depending pivot pin 56 which is mounted in a corresponding bearing ring 58 on the support bar 34.

The aforesaid plug 50 at the outer end of each tubular plunger 49 is formed with lugs which are pivotally connected by a pin 51 to the rear end of an arm 60 having its forward end extending between, and pivotally connected to, an adjacent pair of the cutter units 20 in the aforesaid chain-like assembly thereof. Thus each of the cutter units 20 is arranged between, and is pivotally supported by, two of the arms 60 so that the number of air cylinders 48 is one more than the number of cutter units. Also, and as will be most readily apparent from FIGURE 5, the vertical plane passing longitudinally through each cylinder 48 contains the pivotal axis of the latter and the pivotal axis of the forward end of the respective arm 60 while the axis of the pivotal connection 51 between the arm and the cylinder is normal to this plane.

Each of the cutter units 20 is generally similar in type to the power actuated hand-held shears commonly used for shearing sheep.

Thus the body of each unit 20 is provided at one end thereof with a fixed comb plate 62 having a toothed cutter plate 63 slidably mounted on its outer face, as shown in FIGURES 6, 7 and 8. This cutter plate 63 is reciprocated sidewise by any suitable mechanism contained within the body of the unit 20. This mechanism, in the case of hand shears, is generally operated by a flexible shaft connected to the rear end of the body but for the purpose of this invention, the body preferably houses an air operated driving motor 64 to which compressed air is supplied through a flexible tube 65.

The adjacent sides of each adjacent pair of cutter units 20 are pivotally connected together and to the forward end of the intervening supporting arm 60 about an axis arranged in or close to the cutting plane of each unit, i.e. the plane of the outer or upper surface of the comb plate 62, and parallel to the longitudinal axis of the unit or at right angles to the length of the assembly of units.

This pivotal connection between adjacent units and the arm 60 comprises three appropriately spaced pairs of coaxial bearing lugs through which a common pivot pin 66 is passed, the hinge thus formed being similar to that of a common door hinge. Thus one side of each cutter unit is provided behind the comb plate thereof with a spaced pair of bearing lugs 20*c* and 20*d*, the opposite side thereof is similarly provided with lugs 20*e* and 20*f* arranged out of transverse alignment therewith and the forward end of the arm 60 has projecting end lugs 60*a* and 60*b* spaced apart so that the lugs 20*c* and 20*d* of one unit and lugs 20*e* and 20*f* of the next unit may be arranged therebetween.

The chain of cutter units 20 thus conforms approximately to the contour of the animal as best shown in FIGURE 5, which is a plan view of the assembly as it appears when the hinges at 66 and the comb plates 62 are arranged vertically.

In order to ensure that the comb fingers suitably divide the wool at the junction between each adjacent pair of cutter units, the adjacent comb teeth 62*a* and 62*b* are mutually formed so as to serve as a single divider and thus prevent unsevered wool from passing into the space between the cutter units (see FIGURES 7 and 8). For this purpose, the teeth 62*a* and 62*b* are formed as half teeth arranged so that the hinging axis passes centrally between them when the cutter units are viewed as in FIGURE 8. Also the tip is removed from the tooth 62*b* and the tip 62*c* of the tooth 62*a* extends in front of it as also shown in FIGURE 7. As the hinging axis is disposed in or close to the cutting plane, the said teeth 62*a* and 62*b* serve as a single tooth to divide the wool even when the respective cutter units are angularly displaced.

Each cutter unit 20 is also provided with a roller 68 which is arranged below the base thereof and near the rear end thereof, the roller 68 being mounted on a transverse pin having its ends secured to inclined arms 69 which may be angularly adjustable to enable the roller to be moved towards and from the base. For this purpose, arms 69 may be secured in their adjusted positions, or they may be spring-loaded so as to urge the roller outwardly from the base to a limiting position determined by a suitable stop. The rollers 68 may also be power driven if desired to assist in stretching the skin of the animal.

When a cutter unit is arranged in its operative position as shown in FIGURE 4, it is pressed against the body of the animal by the respective air cylinder 48. The line of action of the force passes between the tips of the comb points and the roller 68 so that the latter serves as a fulcrum to ensure that the comb point tips are maintained in contact with the animal, while in addition, the roller maintains the unit at a suitable angle as also shown in FIGURE 4, thereby permitting the tips of the comb to conform to two-dimensional changes in body contour.

In lieu of driving the rollers 68 in order to stretch the skin, one or more power driven skin stretching rollers may be arranged behind the cutter units and supported independently of these units by the radial arms 32.

In use, the pivoted frame 22 normally occupies its lowermost position shown in FIGURE 9, at which time, the inner ends of the radial arms 32 rest on or are disposed close to the floor and in this position, the mechanism is clear of the path of the suspended animals moving to and from the shearing station. At this time, the support bar 34 is disposed in its outermost position determined by the stops 39 and the plungers of the assembly of cylinders 48 mounted thereon are fully retracted by their springs 52 so that the cutter units 20 are disposed at the maximum distance from the pivotal axis of the radial arms.

When each animal moves to and is stopped at the shearing station, air is supplied to the vertical cylinder 28 to raise the frame 22 to the operative position together with the mechanism supported thereby as shown at "B" in the figure. At this time, the suspended animal is arranged between the radial arms 32 and their axis of rotation passes longitudinally and approximately centrally through the animal.

As the pivoted frame is being moved upwards to its described operative position, the pivoted headrest 29 thereon engages and cradles the head of the animal and so moves it upwards and inwards whereby the head is inserted between the forelegs and this movement is accompanied by an inward tilting of the headrest as it passes over the bent neck of the animal. The head is thus retained between the forelegs and is partly enclosed by the headrest throughout the shearing operation and so is protected from possible injury during the shearing operation.

After the pivoted frame has been raised to its full extent, which is determined by a suitable stop, compressed air is supplied to the cylinders 40 in the radial arms 32 to move the support bar 34 inwardly to its full extent as determined by the stops 38 so that the cutter units 20 are moved towards the adjacent side of the animal though not into contact therewith. Low pressure air is then supplied to the outer end of each of the cylinders 48 to move the assembly of cutter units 20 into contact with the body without exerting an excessive pressure thereon.

At this stage, compressed air is supplied to the driving motors of the individual cutter units so as to reciprocate the cutter plates thereof across the respective combs after which air is supplied to the rack cylinders 45 so that the racks 42 are actuated to turn the radial arms 32 in unison and in the clockwise direction in FIGURE 10 whereby the operating cutter units move downwards over the adjacent side of the animal, then below the back thereof and finally upwardly to a corresponding position at the opposite side as shown in FIGURE 11 and during this movement, the hingedly connected cutter units 20 move inwards and outwards as required to conform to the body curvature. The fleece is thus severed during a single sweep of the assembly of cutter units.

When the radial arms 32 complete their clockwise movement, the unit cylinders 48 are connected to exhaust so that the springs 52 thereof withdraw the cutter units from the animal following which they are fully withdrawn by moving the support bar 34 to its outermost position.

The radial arms are then turned in unison and in the opposite direction whereby they are returned to the start position (FIGURE 10) and finally they are lowered to the original position by means of the pivoted frame 22 to enable the conveyor to move the shorn animal onwards and simultaneously to move a fresh animal to the shearing station. It will be understood that during the upward and downward movements of the pivoted frame 22, the radial arms 32 do not undergo any relative movement. Thus when the pivoted frame is raised to its operative position, the radial arms are placed in the start position.

Preferably the several control valves are operated in the required sequence and at appropriate intervals by any suitable timing device, the operation of which is preferably initiated automatically during each pause of the intermittently movable conveyor. Such timing and valve control means do not, however, form a part of this invention and are not shown in the drawings.

It will, however, be understood that if desired, some or all of the control valves may be manually actuated and that variations may be made in the sequence and other features of the operations as described above.

Although, as above stated, provision is made for regulating the inner and outer positions of the support bar 34, and the operative position of the pivotal axis of the radial arms 32, these adjustments do not normally require variation while shearing a flock of sheep which usually are of the same breed and age group and therefore sufficiently similar in size.

From the preceding description, it will be apparent that the expression "shearing apparatus" as used above and in the following claims is to be understood as comprehending an apparatus for removing a portion only of the wool or hair from an animal.

I claim:

1. Shearing apparatus for animals—especially sheep—comprising elongated wool-severing means of variable shape, said severing means conforming approximately to the varying contours of an animal when arranged longitudinally in contact therewith and pressed thereagainst, means for moving said severing means at least partly around the body of the animal while disposed substantially longitudinally with respect thereto, and means for maintaining said severing means in approximate shape-conforming contact with the animal as said severing means moves therearound, said severing means progressively severing the wool from said animal.

2. Shearing apparatus for animals—especially sheep—comprising elongated wool-severing means of variable shape, said severing means conforming approximately to the body contours of an animal when arranged approximately longitudinally with respect thereto and pressed thereagainst, means for rotating said severing means about an axis passing approximately longitudinally through the body of an animal suspended adjacent thereto by its four legs so that said severing means, while disposed longitudinally with respect to the animal, moves downwardly at one side thereof and then below the back and upwardly at the other side thereof, and means for pressing said elongated severing means inwardly towards the animal as said severing means moves therearound so that said severing means conforms to the contours of the animal and progressively severs the wool therefrom along the length of said severing means.

3. Shearing apparatus for animals—especially sheep—comprising elongated wool-severing means of variable shape, said severing means conforming approximately to the body contours of an animal when arranged approximately lengthwise with respect thereto and pressed thereagainst, said elongated severing means comprising a plurality of shearing units arranged side-by-side, means connecting each adjacent pair of shearing units for permitting relative movements therebetween, each shearing unit including coacting relatively movable cutter members and actuating means for said cutter members, means for rotating said elongated wool-severing means about an axis spaced from and disposed approximately parallel thereto and passing approximately longitudinally through the body of an animal to be shorn, and means for pressing said elongated severing means inwardly towards the body of the animal as said severing means moves therearound so that said severing means conforms to the contours of the animal and progressively severs the wool therefrom along the length of said severing means.

4. Shearing apparatus for animals—especially sheep—comprising two arms spaced apart at such a distance that an animal to be shorn can be positioned lengthwise between said arms while suspended by its four legs, means pivotally supporting said arms for angular movements about a common axis extending longitudinally through the animal, said arms extending outwardly from said axis and being disposed approximately in a common plane containing the axis, elongated wool-severing means of variable shape arranged between and supported by said arms and spaced from said common axis thereof, said severing means conforming to the body contours of the animal, means for turning said spaced arms in unison about said common axis to move said elongated severing means at least partly around the animal, and means for pressing said severing means inwardly against the animal as the severing means is moved therearound by said spaced arms to cause said severing means to conform to the contours of the animal and progressively to sever the wool from the animal along the length of said severing means.

5. Shearing apparatus for animals—especially sheep—comprising elongated wool-severing means of variable shape, said severing means conforming approximately to the body contours of an animal when arranged approximately longitudinally with respect thereto and pressed thereagainst, means for rotating said severing means about an axis passing approximately longitudinally through the body of an animal suspended adjacent thereto by its four legs so that said severing means, while disposed longitudinally with respect to the animal, moves downwardly at one side thereof and then below the back and upwardly at the other side thereof, skin-stretching means spaced from said severing means and disposed approximately parallel thereto, said skin-stretching means being supported for movement around the animal in unison with said severing means, and means for pressing said elongated severing means and said skin-stretching means inwardly towards the animal as they move therearound so that said severing means conforms to the contours of the animal and progressively severs the wool therefrom while said skin-stretching means engages the body of the animal behind said severing means.

6. Shearing apparatus for animals—especially sheep—comprising an elongated wool-severing means of variable shape arranged to conform approximately to the body contours of an animal when disposed longitudinally with respect thereto and pressed thereagainst, said severing means comprising a chain-like assembly of pivotally connected shearing units arranged in side-by-side relationship, each of said shearing units comprising coacting cutter members and means for reciprocating one of said cutter members relatively to the other cutter member, means for supporting said assembly of shearing units, means for rotating said supporting means about an axis passing substantially lengthwise through the body of an animal arranged adjacent thereto and so that said assembly of shearing units extends lengthwise thereof, and means for exerting resilient pressure on said assembly of shearing units to maintain the shearing units substantially in contour-conforming contact with the animal as said assembly of shearing units moves therearound.

7. Shearing apparatus for animals—especially sheep—comprising a pair of arms, means supporting said arms for angular movements about a common axis, said arms being spaced apart at such a distance that an animal suspended by its four legs can be positioned therebetween with said common axis passing substantially longitudinally through the animal, a longitudinally extending supporting member arranged between and connected to said arms, a chain-like assembly of pivotally connected shearing units disposed between said arms and carried by said supporting member, each of said shearing units comprising a coacting pair of cutter members and means for reciprocating one of said cutter members relatively to the coacting cutter member, and means for exerting inward resilient pressure on said shearing units to cause said assembly of shearing units to conform approximately to the body contours of the animal as said assembly moves therearound.

8. Shearing apparatus for animals—especially sheep—comprising a pair of arms, means supporting said arms for angular movements about a common horizontal axis, means for raising and lowering said supporting means, said arms being spaced apart at such a distance that an animal suspended by its four legs can be positioned therebetween with said common axis passing substantially longitudinally through the animal, a longitudinally extending supporting member arranged between and carried by said arms, means for moving said supporting member relatively to said arms and towards and away from said common axis thereof, a chain-like assembly of pivotally connected shearing units disposed between said arms and supported by said supporting member, each of said shearing units comprising a coacting pair of cutter members and means for reciprocating one of said cutter members relatively to the coacting cutter member, and means for exerting inward resilient pressure on said shearing units to cause said assembly of shearing units to conform approximately to the body contours of the animal as said assembly moves therearound.

9. Shearing apparatus for animals—especially sheep—comprising a frame supported for angular movements about a first horizontal axis, a spaced pair of arms pivotally mounted on said frame for angular movements about a common axis spaced from and disposed parallel to said first axis, said arms being spaced apart at such a distance that an animl suspended by its four legs can be arranged therebetween with said common axis thereof passing substantially longitudinally through the animal, a longitudinally extending supporting member arranged between and carried by said arms, means for moving said supporting member relatively to said arms and towards and away from said common axis thereof, a chain-like assembly of pivotally connected shearing units disposed side-by-side between said arms and supported by said supporting member, each of said shearing units comprising a coacting pair of cutter members and means for reciprocating one of said cutter members relatively to the coacting cutter member, means for exerting inward resilient pressure on said shearing units to cause said assembly of shearing units to conform approximately to the body contours of the animal as said assembly moves therearound, and means for adjusting said frame angularly about said first axis to rise and lower said arms.

10. Shearing apparatus for animals—especially sheep—comprising a pair of radial arms, means supporting said radial arms for angular movements about a common axis, said radial arms being spaced at such a distance apart than an animal, suspended by its four legs, can be positioned therebetween with said common axis passing substantially longitudinally through the animal, elongated wool-severing means of variable shape extending between and supported by said radial arms, said elongated severing means comprising a chain-like assembly of pivotally connected shearing units disposed in side-by-side relation between said arms, each of said shearing units comprising a comb plate, a coacting cutter, means for reciprocating said cutter relatively to the comb plate, and a skin-stretching roller mounted behind and spaced from said comb plate, and means for exerting inward resilient pressure on each of said shearing units to cause the comb plate and the skin-stretching roller thereof to bear against the animal so that said assembly of shearing units conforms approximately to the body contours of the animal as said assembly moves therearound.

11. Shearing apparatus for animals—especially sheep—comprising a pair of arms, means supporting said arms for angular movements about a common horizontal axis, said arms being spaced apart at such a distance that an animal suspended by its four legs can be positioned therebetween with said common axis passing substantially longitudinally through the animal, means for turning said arms in unison and in either direction about said common axis, a longitudinally extending supporting member carried by said arms, a chain-like assembly of shearing units arranged in side-by-side relation between said arms and mounted on said supporting member, each of said shearing units comprising a fixed comb plate, a cutter coacting therewith and means for reciprocating said cutter, means for pivotally connecting each adjacent pair of shearing units about an axis disposed longitudinally therebetween and substantially in the plane of the upper surfaces of the respective comb plates, and means operable for exerting inward resilient pressure on said shearing units to cause said assembly of shearing units to conform approximately to the body contours of the animal as said assembly moves therearound.

12. Shearing apparatus for animals—especially sheep—comprising a pair of radial arms, means supporting said arms for angular movements about a common horizontal axis, said radial arms being separated by a distance such that an animal suspended by its four legs can be positioned therebetween with said common axis passing substantially longitudinally through the animal, means for turning said radial arms in unison and in either direction about said common axis thereof, elongated wool-severing means of variable shape arranged between and supported by said radial arms, said severing means comprising a chain-like assembly of relatively movable shearing units arranged in side-by-side relation, each of said shearing units comprising a fixed comb plate, a cutter coacting therewith, and means for reciprocating said cutter, means pivotally connecting each adjacent pair of shearing units about an axis disposed longitudinally therebetween and substantially in the plane of the upper surface of the respective comb plates, a plurality of supporting arms, each supporting arm being pivotally connected at its inner end to a separate shearing unit, and means individual to each supporting arm for imparting resilient pressure inwardly on the outer end of the corresponding supporting arm to cause said assembly of shearing units to conform approximately to the body contours of the animal as said assembly is moved therearound by said radial arms.

13. Shearing apparatus for animals—especially sheep—comprising a pair of radial arms, means supporting said arms for angular movements about a common horizontal axis, said radial arms being spaced apart at a predetermined distance so that an animal suspended by its four legs can be arranged therebetween with said common axis passing substantially longitudinally through the animal, means for turning said radial arms in unison and in either direction about said common axis thereof, a supporting member extending longitudinally between and movably mounted on said radial arms, means for moving said supporting member towards and away from said common axis, elongated wool-severing means of variable shape arranged between said radial arms, said severing means comprising a chain-like assembly of relatively movable shearing units disposed in side-by-side relation, each of said shearing units comprising a fixed comb plate, a cutter coacting therewith, and means for reciprocating said cutter, means pivotally connecting each adjacent pair of shearing units about an axis disposed longitudinally therebetween and substantially in the plane of the upper surface of the respective comb plates, a supporting arm pivotally connected at its inner end to each shearing unit, an air cylinder individual to each shearing unit, said air cylinder being swivelly mounted said longitudinally extending supporting member, and a plunger in each cylinder connected to the outer end of the corresponding supporting arm for exerting resilient pressure inwardly thereon to maintin the associated shearing unit in contact with the animal and to cause said assembly of shearing units to conform approximately to the body contours of the animal as said assembly is moved therearound by said radial arms.

References Cited in the file of this patent

UNITED STATES PATENTS

| | | |
|---|---|---|
| 1,116,881 | Giampietro | Nov. 10, 1914 |
| 1,393,621 | Giampietro | Oct. 11, 1921 |
| 2,080,451 | Wilcox | May 18, 1937 |
| 2,897,537 | Schmidt | Aug. 4, 1959 |